(12) United States Patent
Hobbs et al.

(10) Patent No.: US 6,567,172 B1
(45) Date of Patent: May 20, 2003

(54) SYSTEM AND MULTIPASS PROBE FOR OPTICAL INTERFERENCE MEASUREMENTS

(75) Inventors: Philip Charles Danby Hobbs, Briarcliff Manor, NY (US); Richard John Lebel, Williston, VT (US); Martin Patrick O'Boyle, Cortlandt Manor, NY (US); Theodore Gerard van Kessel, Millbrook, NY (US); Hemantha Kumar Wickramasinghe, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 149 days.

(21) Appl. No.: 09/635,202

(22) Filed: Aug. 9, 2000

(51) Int. Cl.[7] .................................................. G01B 9/02
(52) U.S. Cl. ...................... 356/451; 356/503; 356/432
(58) Field of Search .................. 356/451, 432, 356/436, 437, 503, 630, 409; 250/339.07, 339.08, 559.27, 559.28

(56) References Cited

U.S. PATENT DOCUMENTS

| 3,628,872 A | * 12/1971 | Miranda ..................... 356/432 |
| 5,461,007 A | 10/1995 | Kobayashi |
| 5,585,634 A | * 12/1996 | Stevenson et al. ..... 250/339.11 |
| 5,777,739 A | 7/1998 | Sandhu et al. |
| 5,949,927 A | 9/1999 | Tang |
| 5,961,369 A | 10/1999 | Bartels et al. |
| 6,319,093 B1 | * 11/2001 | Lebel et al. .................... 451/6 |

OTHER PUBLICATIONS

Herbert E. Litvan, Ph.D. et al., "Implementing Real–Time Endpoint Control in CMP", Semiconductor International, Jul. 1996, pp. 259–264.

* cited by examiner

*Primary Examiner*—Samuel A. Turner
*Assistant Examiner*—Patrick Connolly
(74) *Attorney, Agent, or Firm*—Stephen C. Kaufman, Esq.; McGinn & Gibb, PLLC

(57) ABSTRACT

An optical system includes a spectrometer and a multipass optical probe. The multipass optical probe includes a retroreflective element such that light propagating, in a first direction, from the probe to a sample under test and passing through or reflecting from the sample under test, is reflected back in a second direction opposite the first direction, so as to pass through the sample under test a total of at least two times.

25 Claims, 2 Drawing Sheets

SYSTEM AND MULTIPASS PROBE FOR OPTICAL INTERFERENCE MEASUREMENTS

BACKGROUND OF THE INVENTION

1. Field of the Invention

The present invention relates to a multipass optical probe, and more particularly to a multipass probe for performing optical interferometric measurements of film properties in conjunction with established optical detection and signal analysis methods.

2. Description of the Related Art

The measurement of thin films on semiconductor and other micro-manufactured parts is typically performed using optical interference techniques in which the reflectance or transmission properties are measured using an optical probe.

Then, the acquired spectra is analyzed with a computer program using known film properties and physics to solve for unknown properties such as film thickness, density etc. For ideal films having one or more perfectly flat layers, these measurements are straight-forward and well documented.

However, in practice, interferometric film thickness and composition measurements on production parts are complicated by the presence of pre-existing structures, topography, and films underneath or embedded in the film being measured and the difficulty of physically moving the sample or part under test to the measurement instrument and aligning it to the instrument for measurement.

Further, the process tool environment that is characteristic of semiconductor and related micro-manufacturing processes is an environment where vibration is common, precise optical alignment is either difficult or impossible, and physical space is constrained. Examples of these tools and environments include plasma deposition tools, chemical mechanical polish (CMP) tools, photoresist application tools, and electro-plating cells, etc. Thus, if one wishes to perform these measurements in the process tool environment, then these factors must be considered.

Existing manufacturers cope with these problems by moving the part being measured from the process environment to a vibration-isolated ex-situ tool, precisely aligning the part, positioning the part and examining a small area containing an easy-to-measure target or region. This operation is accomplished only with considerable time and expense in the form of precision tooling. Current ex-situ tooling is typically large and expensive (0.75M$).

On the other hand, current methods of measuring semi-transparent film thickness and composition using optical interference methods are extremely accurate.

However, prior to the invention, there has been no effective structure or operation of 1) measuring thin film properties of thickness and composition with an inexpensive compact, vibration-insensitive, topography-insensitive and alignment-insensitive optical interference probe; 2) retaining the accuracy advantages inherent in optical interference film measurements; and 3) measuring thin film properties in-situ relative to the process environment.

Further, in order to perform accurate film thickness measurements, conventional techniques often require the precise positioning of a single pass optical beam on a small target (e.g., 100×100 microns) to avoid the topographic complexity inherent in semiconductor structures. This implies the use of expensive and complicated positioning systems and optics. Since the location of the target is sample specific, many software "recipes" must be maintained. This is another problem.

SUMMARY OF THE INVENTION

In view of the foregoing and other problems, disadvantages, and drawbacks of the conventional methods and structures, an object of the present invention is to measure thin film properties of thickness and composition with an inexpensive compact, vibration-insensitive, topography-insensitive and alignment-insensitive optical interference probe.

Another object of the invention is to retain the accuracy advantages inherent in optical interference film measurements.

A further object of the invention is to measure thin film properties in-situ relative to the process environment.

In a first aspect of the present invention, a multipass optical probe includes a retroreflective element such that light propagating, in a first direction, from the probe to a sample under test and passing through or reflecting from the sample under test, is reflected back in a second direction opposite the first direction passing through the sample under test a total of at least two times.

In a second aspect of the present invention, a multi-pass optical probe for performing optical thin film thickness and composition measurements, includes an optical light source for emitting light to a sample, a detector for detecting the light reflected from the sample, one of a spectral dispersion element and a filtration element constructed to propagate light from the light source to sample surface films under test, and back to the detector such that a given ray of light passes through substantially a same location on the sample at least two times.

With the unique and unobvious features of the present invention, a probe is constructed such that light propagates from the probe through the sample under test (e.g., either in reflection or transmission) and back to the probe, such that any given ray passes through the test sample two or more times along the same path.

As a result, several significant advantages are derived over the conventional probes including increased interference signal contrast (e.g., higher signal-to-noise ratio), increased rejection of topographic imperfections, increased tolerance of sample alignment variations, and compact, inexpensive construction of the probe.

The invention provides a probe in which thin film properties of thickness and composition can be measured with an inexpensive compact, vibration insensitive, topography insensitive and alignment insensitive optical interference probe, the accuracy advantages inherent in optical interference film measurements are retained, and thin film properties are measured in-situ relative to the process environment.

Further, the aforementioned advantages drive an overall reduction of the number and complexity of sample specific recipes necessary to measure production semiconductors. Indeed, the present invention typically requires approximately $\frac{1}{20}$th the number of product specific recipes. The maintenance of measurement recipes is a significant cost item associated with conventional methods that the present invention avoids.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 2:
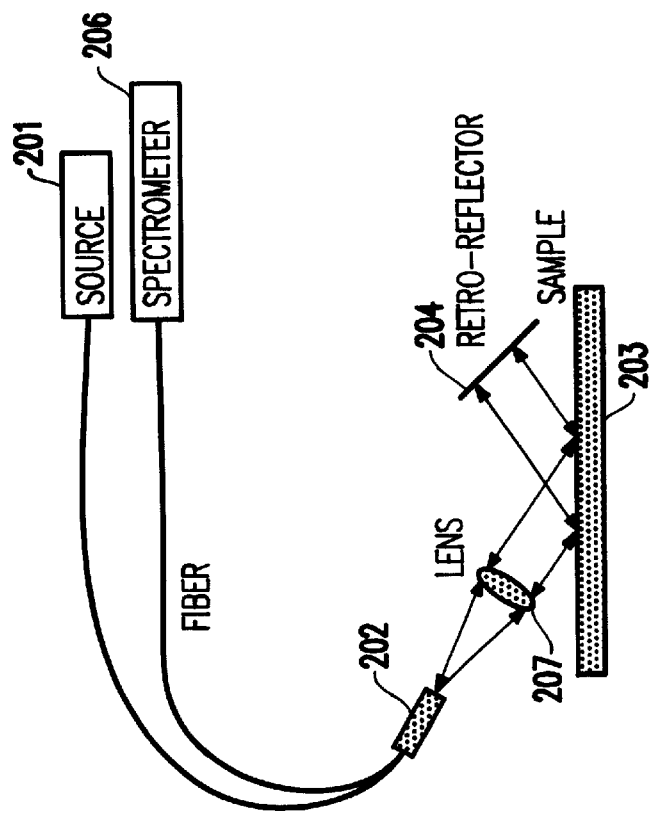
FIG. 2 illustrates a structure 200 according to a second embodiment of the present invention, and specifically a structure using a collimated beam at a large angle of incidence.

Referring now to the drawings, and more particularly to FIGS. 1–4, there are shown preferred embodiments of the method and structures according to the present invention.

Generally, the invention provides a multi-pass optical probe constructed for performing optical thin film thickness and composition measurements. This class of probes includes an optical light source, a detector, a spectral dispersion and/or filtration elements and optics constructed to propagate light (e.g., broadband light having more than 1 wavelength) from the probe to the sample surface films under test, and back to the detector such that a given ray of light passes through the same location on the sample two or more times always along the same optical path.

Figure 1:
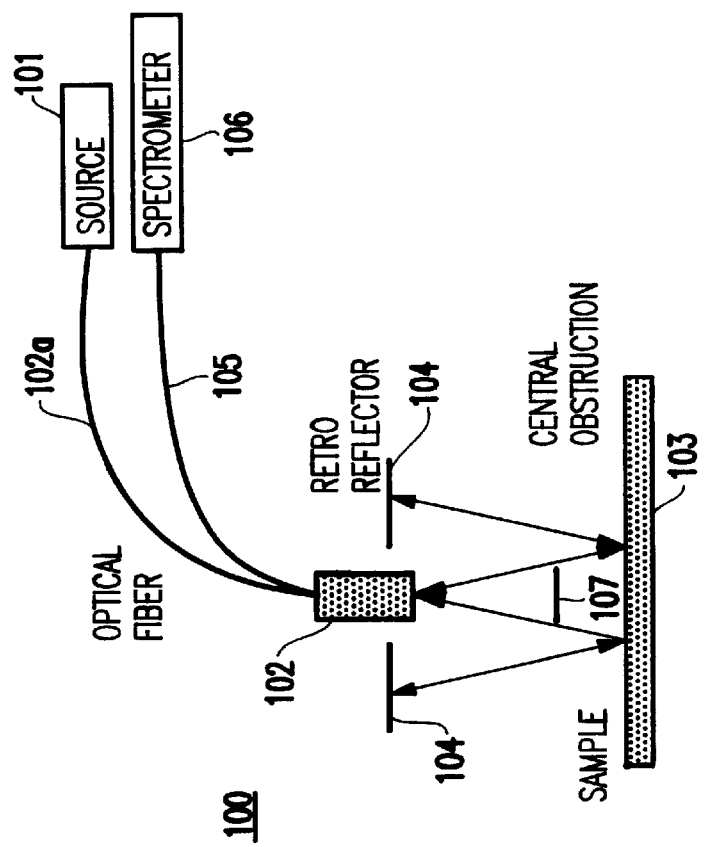
FIG. 1 illustrates a structure 100 according to a first embodiment of the present invention.
Figure 4:
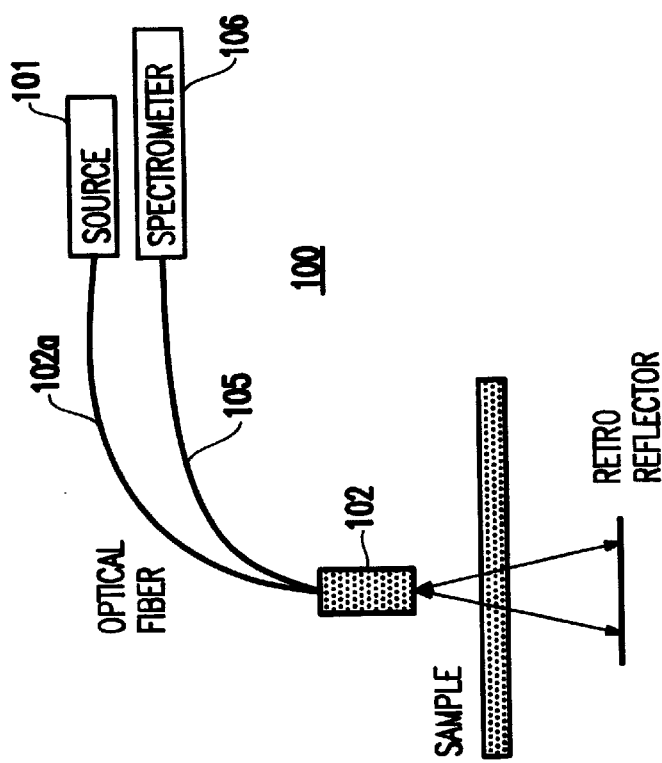
FIG. 4 illustrates a structure 400 according to a fourth embodiment of the present invention, and specifically to a structure illustrating the multipass concept in transmission, this particular embodiment being similar to that of FIG. 1.
Figure 3:
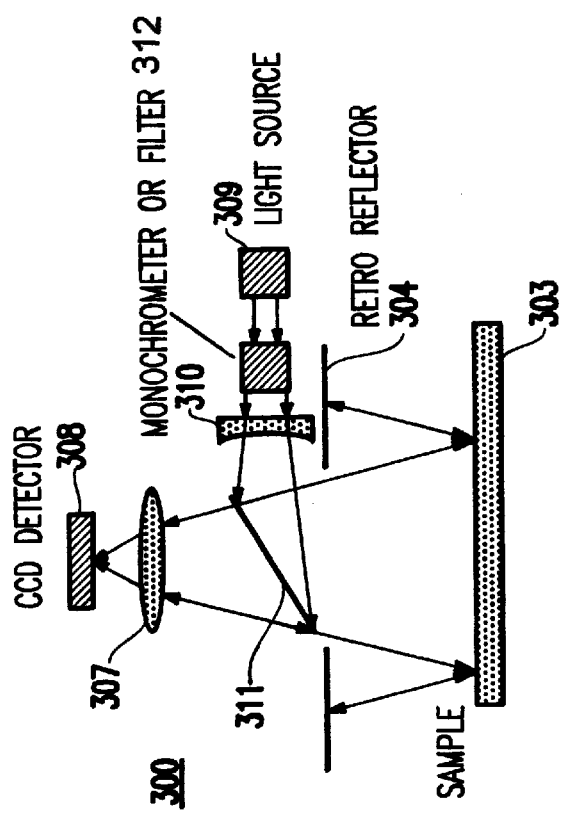
FIG. 3 illustrates a structure 300 according to a third embodiment of the present invention, and more specifically to a structure using the multipass concept in bulk optics.

FIGS. 1, 2, and 3 illustrate this concept in three practical, exemplary, non-limiting embodiments for reflective measurements. FIG. 4 illustrates this concept in transmission.

A key characteristic of each of these embodiments is the introduction of a retroreflective element positioned and sized to reflect light passing through a specific region of space back along the path it came. A retroreflector is defined as a surface or material which returns incident light in substantially the exact same direction from which it came. It may (or may not) be along the same optical path depending upon the configuration of the retroreflector.

For example, a corner cube will send a light ray back in the opposite direction but the ray will be offset slightly (e.g., very close, but parallel, to the original path). However, retroreflective tape is advantageous in that it sends the light back in the opposite direction and substantially along the same optical path. Thus, the exact retrace of the path will depend upon the type of retroreflective component used.

The multi-pass functionality and spatial filtration is achieved with the introduction of the retroreflective element. In practice, this can be achieved using mirrors, lenses, fibers, etc. Thus, while the inventors have found that the most practical method is to use retroreflective tapes and films, other components may be used including a retroreflective cube such as a corner reflectors, quarter cube with mirrors, etc.

The retroreflector in the combination of the invention has many properties and derivative qualities which provide unexpectedly superior results. First, the retroreflector is alignment-insensitive. That is, the conventional system may employ a mirror as a conventional reflector. However, a mirror requires exact, precise alignment. The retroreflector in the probe of the present invention does not require such an alignment.

Further, since the light from the retroreflector of the probe goes through the sample (material) twice, there is an enhanced interference (signal) contrast similar to light going through an optical filter twice.

Finally, the retroreflectors may be used in a confocal geometry such that if light is output from a fiber, then the light (e.g., specular component of the light) will fly right back in from where it came.

The above features provide enormous advantages and allow the invention to be used with optical fiber, imaging situations (e.g., see FIG. 3), etc.

FIG. 1 illustrates a first embodiment of the invention, and more specifically to a near normal incidence probe 100 that has been used in early process layers of semiconductor parts.

In FIG. 1, light is emitted from a source 101 along a fiber 102a in a cone, reflects off the sample surface 103 under test, and retro reflects off a retro-reflector 104. The light returns to the fiber bundle 102 along the path it came through the sample 103. A central obstruction mask 107 is placed to prevent specular (single pass) light from returning to the bundle. The light is measured by a detector 106 (e.g., a spectrometer).

It is noted that light that scatters from surface topography is effectively lost from the beam and does not return to the detector fiber 105 and that the light travels through the film stack twice. This effectively makes the probe most sensitive to the planar regions of the sample 103 where light is specularly reflected. In this case, the range of angles is constrained by the numerical aperture (N.A.) of the fiber, the inner and outer diameter and position of the retroreflector and the central obstruction. By adjusting these variables, precise spatial beam properties can be achieved. It is noted also that even large angle variations of the sample do not effect the properties of the beam. By rejecting topographic influences, precise positioning of the beam among the sample is significantly less critical.

FIG. 2 illustrates a collimated beam at a large angle of incidence in a probe 200 according to a second embodiment of the invention, having a source 201, fiber bundle 202, retroreflector 204, fiber 205, and detector 206 similar to those of FIG. 1. An objective lens 207 is provided between the fiber bundle and 202 and the sample 203 for focusing the output from the sample.

The probe 200 inherits the property that topography is rejected and improves overall interference signal contrast by constraining the range of angles. This range of angles may be tailored to the application (e.g., the present inventors have found +/-10 degrees or so to be useful). Small spot or narrow beam profiles can be achieved with this configuration. Both FIGS. 1 and 2 are effectively confocal in that they take light from a small aperture and return it through a small aperture. This also contributes to good interference signal contrast. In both cases, the detector 106, 206 is a spectrometer connected to the probe by a bundle of one or more fibers.

FIG. 3 illustrates the use of the multipass concept in bulk optics (e.g., in an imaging configuration). In this configuration, large-areas of a sample can be examined at high resolution by introducing an array detector (e.g., charge-coupled device) 308 and an extended source 309. Further included are an objective lens 307, a convex lens 310, a monochrometer or filter 312 and a reflector 311.

Light passes from the source through the filter or monochrometer 312, and is imaged on the sample through the lens 310 and beam splitter 311. The light reflects off the sample, then retroreflects from element 304 and returns back to the same initial reflection spot on the sample where it is again reflected to lens 307 where it is then imaged to a CCD detector, thereby providing an image of the sample. The monochrometer or filter element 312 allows the selection of a single wavelength to allow image acquisition at that specific wavelength. By iterating at different wavelengths and storing successive images from the CCD, spectral data can be observed over an area of the sample at high resolution. The filter element in this case can be constructed using an interferometric (e.g., Michealson) or etalon to allow fourier transform imaging that is particularly useful in the film thickness measurements mentioned above.

Because of the properties of the retro reflector 304, this configuration is an effective analog of many FIG. 2 systems in one package.

FIG. 4 illustrates the multipass concept in transmission, and specifically the configuration of this particular embodiment is similar to FIG. 1.

Thus, with the unique and unobvious aspects of the invention, a probe (and system including the probe) is provided in which thin film properties of thickness and composition can be measured with an inexpensive compact, vibration insensitive, topography insensitive and alignment insensitive optical interference probe, the accuracy advantages inherent in optical interference film measurements are retained, and thin film properties are measured in-situ relative to the process environment.

While the invention has been described in terms of several preferred embodiments, those skilled in the art will recognize that the invention can be practiced with modification within the spirit and scope of the appended claims.

For example, it is noted that the invention can be incorporated into a system with a spectrometer. Such a spectrometer can be either an FTIR spectrometer having an interferometer on the back end, or a dispersive-type spectrometer.

Having thus described our invention, what we claim as new and desire to Secure by Letters Patent is as follows:

1. An optical system comprising:
   a spectrometer, and
   a multipass optical probe operatively coupled to said spectrometer, said multipass optical probe comprising:
      a light source for emitting a light through an orifice;
      a light collector or detector for receiving said light through said orifice; and
      a retroreflective element configured such that light propagating, in a first direction, from the probe to a sample under test and passing through or reflecting from the sample under test, is retro-reflected back in a second direction opposite the first direction so as to pass through or reflect from substantially a same location on the sample under test a total of at least two times.

2. The system of claim 1, wherein the light reflecting in the second direction is along the incident path of the light.

3. The system of claim 1, wherein said retroreflective element comprises a retroreflective tape.

4. The system of claim 1, wherein said retroreflective element comprises a corner reflector.

5. The system of claim 1, wherein said light comprises broadband light.

6. The system of claim 1, wherein said multipass optical probe is for performing interference measurements of said light.

7. The system of claim 1, wherein said multipass optical probe is for performing interference measurements of films.

8. The system of claim 1, wherein said spectrometer comprises a dispersive-type spectrometer.

9. The system of claim 1, wherein said spectrometer comprises an interferometric-type spectrometer.

10. The system of claim 1, wherein said spectrometer comprises an imaging-type spectrometer.

11. The system of claim 1, further comprising a fiber for transporting the light.

12. The system of claim 1, further comprising bulk optics for forming a beam for transporting the light.

13. A multipass optical probe comprising:
    a light source for emitting a light through an orifice;
    a light collector or detector for receiving said light through said orifice; and
    a retroreflective element configured such that light propagating, in a first direction, from the probe to a sample under test and passing through or reflecting from the sample under test, is retro-reflected back in a second direction opposite the first direction so as to pass through substantially a same location on the sample under test a total of at least two times.

14. The probe of claim 13, wherein the light reflecting in the second direction is along the incident path of the light.

15. The probe of claim 13, wherein said retroreflective element comprises a retroreflective tape.

16. The probe of claim 13, wherein said retroreflective element comprises a corner reflector.

17. The probe of claim 13, wherein said light comprises broadband light.

18. The probe of claim 13, wherein said multipass optical probe is for performing interference measurements of said light.

19. The probe of claim 13, wherein said multipass optical probe is for performing interference measurements of films.

20. A multi-pass optical probe for performing optical thin film thickness and composition measurements, comprising:
    an optical light source for emitting light to a sample;
    a detector for detecting said light reflected from said sample;
    an element constructed to propagate light from the light source to sample surface films under test, and back to the detector such that a given ray of light passes through substantially a same location on the sample at least two times.

21. The probe according to claim 20, wherein the given ray of light passes along substantially the same optical path.

22. The probe according to claim 20, wherein said element includes a spectral dispersion element.

23. The probe according to claim 20, wherein said element includes a filtration element.

24. The probe according to claim 20, wherein said element includes an interferometric, etalon-type element.

25. A method of performing optical interference measurements of film properties of a sample, comprising:
    propagating, by a retroreflective element, light, in a first direction, from a probe to a sample under test and passing through or reflecting from the sample under test;
    reflecting back said light in a second direction opposite the first direction so as to pass through substantially a same location on the sample under test at least two times.

* * * * *